UNITED STATES PATENT OFFICE.

HENRY BLUMENBERG, OF LOS ANGELES, CALIFORNIA, ASSIGNOR TO CLIFFORD I. HINMAN, OF LOS ANGELES, CALIFORNIA.

PROCESS OF TREATING BORAX ORES.

1,259,719.

Specification of Letters Patent.   Patented Mar. 19, 1918.

No Drawing. Original application filed April 26, 1916, Serial No. 93,763. Divided and this application filed November 16, 1916. Serial No. 131,786.

*To all whom it may concern:*

Be it known that I, HENRY BLUMENBERG, a citizen of the United States, residing at Los Angeles, in the county of Los Angeles and State of California, have invented new and useful Improvements in Processes of Treating Borax Ores, of which the following is a specification.

My invention relates to a process of treating borax ores such as the borates of the alkali and alkaline earth metals, likewise the boro-silicates of the alkali and alkaline earth metals.

It is a well known fact that at the present time, the calcium boro-silicates cannot be profitably concentrated for commercial purposes owing to the excessive cost of extracting the boric acid from this class of ores; neither can the low grade calcium borate ores such as pandermite $Ca_2B_6O_{11}+4H_2O$ and sodium boro-calcite be successfully treated for the same reasons. Mostly all the calcium borate in the United States is mined in California, and the largest consumption of borax is on the Atlantic coast. The best known practical commercial method of decomposing calcium borate is by roasting which is expensive and is limited to the calcium borate solely, as the calcium boro-silicates as a rule do not contain boric acid in sufficient quantities to make the roasting process profitable.

I am aware that various processes have been suggested for chemically decomposing the ores of calcium borates and the calcium boro-silicates, and which involve the use of sulfuric acid, sulfurous acid fumes injected with compressed air, or steam, hydrochloric acid. I am also acquainted with the double decomposition processes such as heating the finely ground ore either in solution or by fusion with the various sulfates, carbonates, bicarbonates, etc. All the processes mentioned leave, as a rule, by-products which have practically no commercial value. Furthermore, said processes are too expensive, so that they are not a commercial success for the reason that the crude material is either too low grade or the ore is geographically situated where said processes cannot be profitably applied.

It is a well known fact that at present the only practical process for concentrating the crude boric ores profitably is the roasting method, and even this method yields a finished product of not more than 40% or 45% purity, commonly called borax flour, which is sacked and shipped from California to the refineries at eastern points. Over 50% of the total material shipped is waste material. By my novel process, practically no valueless by-products are produced. The decomposing agents employed are extracted and used over and over again in the cycle of operation. Furthermore no high temperatures are required in any step of my process.

The present case is a division of my application for U. S. Letters Patent for a process of treating borax ores, Serial No. 93,763, filed April 26, 1916. The claims in the present case are drawn to a treatment of borax ores with nitric acid. The present case has its claims limited to the treatment of borax ores with sodium nitrate to form borax, while another division of the patent application filed of even date, Serial No. 131,785, has its claims limited to the production of calcium nitrate.

A calcareous borax ore, such as colemanite ore is finely ground and mixed with finely ground sodium nitrate and heated, forming sodium borate and calcium nitrate, the whole forming a fused mass. This fused mass is digested with water and the sodium borate is separated from the calcium nitrate by a process of cooling and crystallization.

Care should be taken in heating the mixture of powdered borax ore and sodium nitrate to stop short of the point where nitrous fumes are given off. If the heating is continued beyond this point, the calcium nitrate will be decomposed into calcium oxid and nitrogen oxids. The oxid of calcium will combine with the sodium borate and form a boron calcium sodium glass, which would have to be treated with sulfuric acid to separate the constituent parts from one another.

The calcium nitrate thus produced may be used as such and forms a valuable fertilizer for which there is a large market, or the calcium nitrate may be heated to form calcium oxid and nitric acid oxids, the latter of which may be made into nitric acid in the well-known manner. The calcium oxid thus obtained is fluffy and of remarkable purity, and is therefore especially adapted for use in sugar refining or extracting the sugar from molasses.

If it is desired to use calcium nitrate as a fertilizer, it is preferably mixed with calcium oxid to form a basic calcium nitrate. Suitable proportions for the basic calcium nitrate are one molecule of calcium oxid to one molecule of calcium nitrate. It is advisable in concentrating the calcium nitrate solution in the last stages of evaporation to add from 15% to 25% of calcium oxid in order to render the resulting mass more friable and easier to manipulate. The normal calcium nitrate has a tendency to absorb moisture and to become colloidal.

It is thus seen that I have devised an economical and flexible process of treating borax ores which leaves practically no valueless by-products and yielding, besides borax, either calcium nitrate or calcium oxid and nitric acid, as market conditions may determine.

I claim:

1. A process of treating borax ores, comprising heating a calcareous borax ore with a nitrate of an alkali metal to form a fused borax glass.

2. A process of treating borax ores, comprising heating a calcareous borax ore with a nitrate of an alkali metal to form a fused mass, digesting the fused mass with water and separating the borate of the alkali metal from the calcium nitrate.

In testimony whereof I have signed my name to this specification.

HENRY BLUMENBERG.